Figure 1:
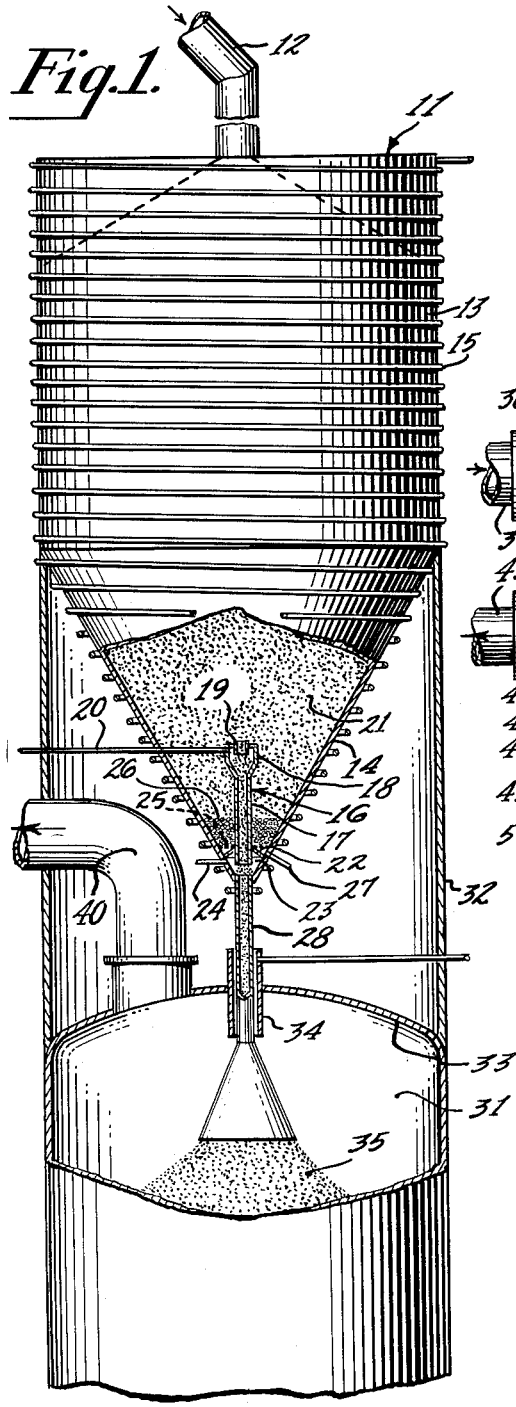

May 15, 1962 N. M. KAPP ET AL 3,034,993
DESULFATION OF CLAY CATALYST
Filed April 29, 1958 2 Sheets-Sheet 1

INVENTORS.
Numer M. Kapp &
Richard E. Ashwill
BY
William Klabunde
ATTORNEY.

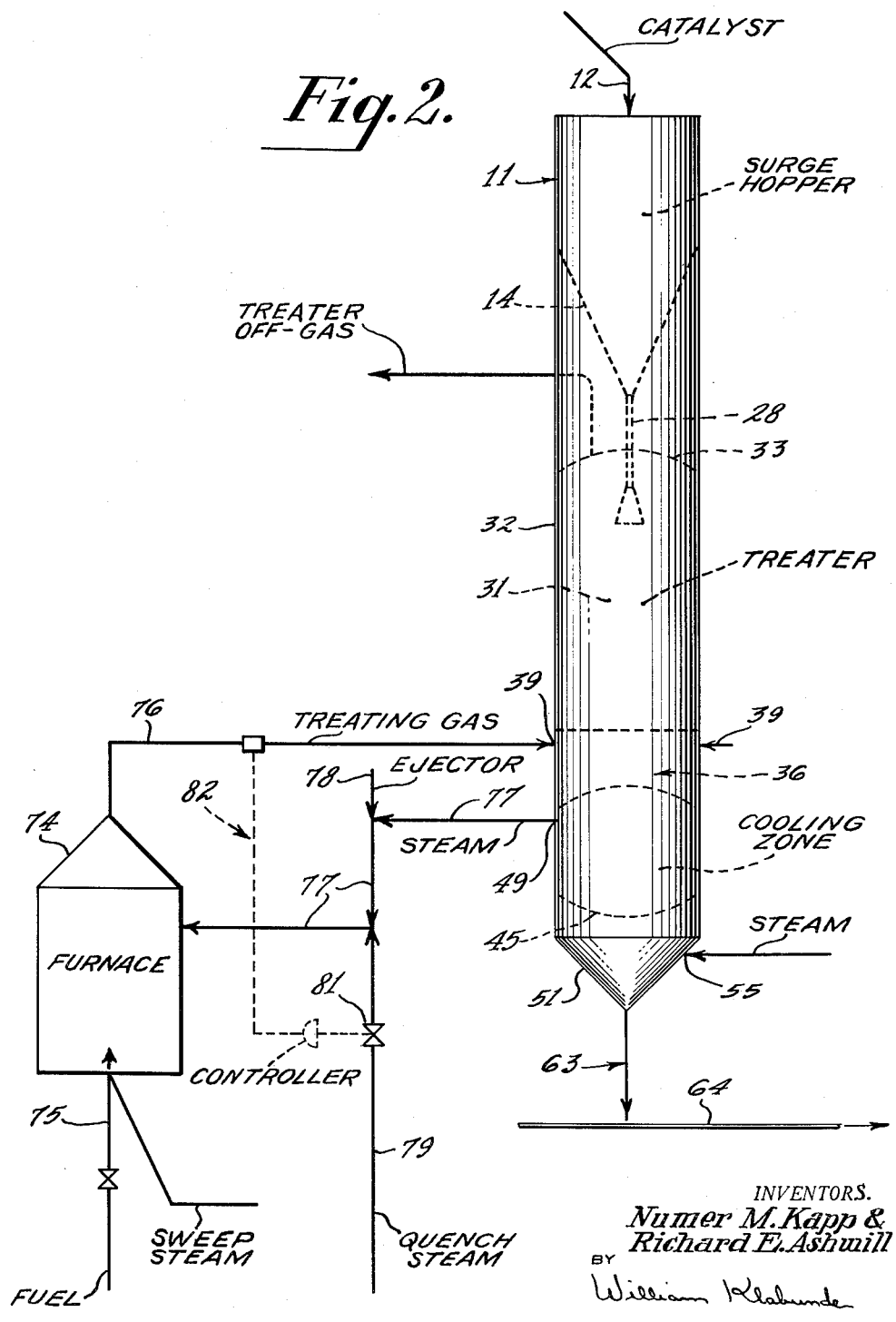

3,034,993
Patented May 15, 1962

3,034,993
DESULFATION OF CLAY CATALYST
Numer M. Kapp, Slippery Rock, Pa., and Richard E. Ashwill, Claymont, Del., assignors to Air Products and Chemicals, Inc., a corporation of Delaware
Filed Apr. 29, 1958, Ser. No. 731,738
8 Claims. (Cl. 252—450)

This invention relates to the treatment of natural earths and clays, such as kaolin clay and certain sub-bentonite clays, to produce an argillaceous contact mass in the form of granules or pellets having properties which render it suitable as a contact material for the catalytic conversion of hydrocarbons.

Such clays, in their raw state, are generally substantially inert or have a tendency to promote coke formation and are, therefore, unsuitable in the raw state as a hydrocarbon conversion catalyst. It has been found, however, that when such clays are treated with a mineral acid, such as sulfuric acid, under particular conditions of temperature the clay becomes activated and acquires improved properties of catalytic activity, heat stability and adsorptive capacity.

There are various known techniques for acid-activating such clays using $H_2SO_4$ as the mineral acid both in liquid and vapor phase. These techniques are exemplified, for example, in U.S. patent applications Serial No. 508,798, filed May 16, 1955, now Patent 2,904,520, and Serial No. 579,371, filed April 19, 1956, now Patent 2,928,793, which, respectively, disclose liquid-phase acid-activation while the granules or pellets of catalyst are maintained as a fixed bed and vapor-phase acid-activation while the catalyst moves as a compact flowing mass through the treating zone.

In the case of liquid-phase sulfation, the activation step is followed by an aging or denning step at elevated temperature for a period sufficient to complete the sulfation reaction. With vapor-phase sulfation, the clay may be contacted with vaporous $SO_3$ in successive treatments, with intermediate cooling to prevent excessive temperature rise due to the exothermic sulfation reaction.

Following the complete sulfation treatment the catalyst granules or pellets are subjected to a desulfation treatment wherein the pellets are contacted with a gaseous mixture comprising steam and reducing gas at temperatures in the range of about 1450°–1600° F., such as 1525°–1550° F., to effect the desired desulfation.

The present invention is concerned primarily with the desulfation treatment of catalyst pellets or granules regardless of the method of their previous sulfation.

In accordance with the present invention, sulfated catalyst is introduced into the upper end of a continuous confined downflow path comprising a plurality of separate zones or chambers which may be located either within a single upright vessel or within a plurality of superimposed vessels, through which confined path the catalyst gravitates as a vertically continuous compact moving mass. The downflow path includes a surge zone, which may be in the form of an elongated hopper having catalyst inlet at the top to receive the charge of sulfated catalyst and an elongated vertical conduit at the bottom for transferring the compactly flowing catalyst into the upper end of a treating zone located beneath the surge zone and depositing the catalyst directly on the surface of a compact moving bed of catalyst comprising the treating zone. In order to avoid any undesirable gas migration between the surge and treating zones the long conduit connecting the two is caused to operate as a seal leg by the introduction of a gaseous sealing medium, such as air, at an intermediate level along the conduit.

As the catalyst gravitates through the storage or surge zone, every precaution is taken to avoid any condensation of steam which may be present in the catalyst mass as a carryover from the denner, or which may occur as a result of the partial dehydration of the sulfated catalyst continuing beyond the denning zone. Air is introduced at the bottom of the surge zone in order to purge the catalyst of any traces of steam as well as to provide the aforementioned seal between the surge and treating zones. The purging effluent is disengaged from the catalyst at the top of the seal leg and is removed from the system.

The entire surge hopper is steam traced so that, if any appreciable amount of moisture happens to be present in the catalyst mass, the moisture will not condense on the walls of the hopper. A stand-by drain is provided for removing any condensate. The heat supplied by such steam tracing serves to maintain the catalyst in the surge hopper at a temperature in the range of about 212°–300° F., such as between about 215°–290° F.

Within the treating zone the compact mass of catalyst gravitates countercurrently to the flow of steam and reducing gas, and is heated rapidly until it eventually attains the temperture of the incoming treating gas. The treating gas mixture may comprise, in addition to the steam, a mixture of hydrogen, nitrogen, carbon monoxide and carbon dioxide. The off-gas is discharged from the upper end of the treating zone, and the catalyst is withdrawn from the bottom thereof as a plurality of vertical confined streams which are conveyed into the upper region of a cooling zone immediately below. The treater or reducer gas mixture is obtained from an external heating zone outside the aforementioned downflow path and, at controlled high temperature, is introduced into the lower end of the treating zone.

Within the cooling zone, the desulfated catalyst is contacted with a coolant gas, such as steam, which is introduced into the zone at relatively low pressure and at a temperature of about 212°–250° F. The catalyst flows as a compact moving bed through the relatively shallow cooling zone and during its passage through the zone the temperature of the catalyst is cooled to a temperature of approximately 600° F. The steam flows upwardly through the bed within the cooling zone and is discharged from the upper region thereof at a temperature of approximately 900° F.

The cooled desulfated catalyst is discharged from the bottom of the cooling zone through a conventional solids draw-off system adapted to provide a uniformity of flow throughout the horizontal area of the bed. The solids draw-off system discharges the catalyst at the bottom of the downflow path as a single compact moving column which deposits the solids directly onto the surface of a continuously moving conveyor of known design, such as a rotating table or an oscillating table, which meters the catalyst flow. Adjustable means at the bottom of the single catalyst discharge outlet controls the size of the pile of solids which may flow onto the conveying surface. This, together with adjustable control on the movement of the conveying surface below the discharge outlet, serves to control the rate of catalyst withdrawal from the downflow path. Throughout the entire downflow path the flow of solids is unrestricted except for the restriction imposed by the discharge control means, so that the flow of catalyst along the donwflow path is in the form of a vertically-continuous compact moving mass flowing partly as a single stream and partly as a plurality of streams.

It is a feature of the invention that cooling of the catalyst, following desulfation, is effected by the use of low pressure steam. This is accomplished by the use of a conventional high pressure steam ejector in the gas discharge conduit leading from the cooling zone. The steam ejector in the outlet line maintains the desired rate of steam flow through the catalyst bed within the cooling zone.

The steam discharging at high temperature from the cooling zone is passed through the heater or furnace which supplies reducer gas at elevated temperature to the treating zone. In order to control the temperature of the stream of reducer gas flowing from the furnace to the treating zone, additional quench steam may be introduced into the steam line at a location between the cooling zone and the furnace. Such additional quench steam is introduced only as needed, and its introduction is controlled by conventional valve control means in the quench steam supply line responsive to temperature changes in the reducer gas stream leading from the furnace to the treating zone. Thus, with the exception of a small amount of sweep steam which is introduced into the furnace around the burner tip to prevent carbon formation, the major supply of steam to the furnace, and hence to the treating zone, is obtained from the catalyst cooling zone, with relatively small additional amounts being introduced as quench to maintain the proper temperature control, and as motive steam.

Figure 1A:
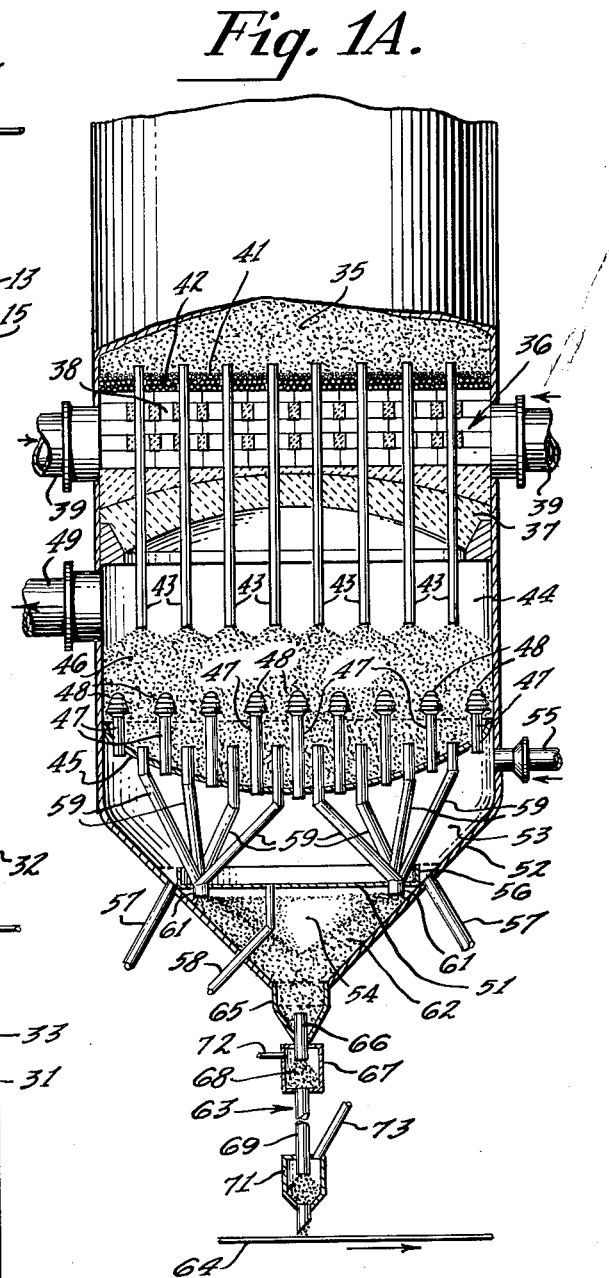

For a fuller understanding of the invention, reference may be had to the following specification and claims, taken in connection with the accompanying drawings forming a part of this application, in which FIGS. 1 and 1A are elevation views, in partial section, respectively showing the upper and the lower half portions of a treating unit adapted to carry out the method of the invention; and FIG. 2 is a diagrammatic view, showing a system including the treating unit disclosed in FIGS. 1 and 1A.

In FIGS. 1–1A of the drawings, showing a preferred form of treating unit in accordance with the invention, the unit comprises an elevated closed hopper 11 having at its upper end a catalyst inlet conduit 12 through which catalyst to be treated may be introduced as a continuously flowing stream. The catalyst supply hopper 11 comprises a vertical cylindrical portion 13 and a bottom conical portion 14 terminating in a single outlet. The walls of the conical portion are of such slope as to provide a smooth continuous flow of catalyst from the hopper. The entire hopper 11 is steam traced by being surrounded with a heating coil 15 through which steam or any other suitable fluid heat-exchange medium may be continuously circulated so as to maintain the catalyst within the hopper at a temperature just above the temperature at which the catalyst is received from the denner, thereby avoiding any appreciable condensation of moisture in the hopper. Such steam may be present in the catalyst mass as a result of unavoidable upsets in the system or as water release from the catalyst pellets received from the denner.

An internal gas-solids disengager 16 is axially positioned within the bottom region of the hopper 11 a short distance above the bottom outlet of the conical section 14, for the purpose of disengaging the seal gas from the catalyst flowing as a compact stream out of the hopper.

The disengager 16 comprises an elongated vertical standpipe 17 having at its upper end an enlarged portion forming a disengaging chamber 18. Chamber 18 has a short inlet nipple 19 at the top for admitting catalyst into the disengaging chamber, and has an outlet conduit 20 high in the side wall thereof for discharging disengaged air. Nipple 19 extends downwardly into chamber 18 to a level below that of the air outlet conduit 20. Catalyst withdrawn from the bed 21 through nipple 19 as a compact moving stream expands within the housing 18 and forms an exposed annular surface of solids about the lower end of the nipple 19, through which the air rising through standpipe 17 may be disengaged from the solids.

Standpipe 17 has its lower end portion rigidly set in air-tight connection within the central opening of a frusto-conical member 22, which member has its lower perimeter attached in air-tight connection to the inner wall of the conical section 14. The lower end portion of standpipe 17 extends into the small chamber 23 formed beneath the frusto-conical member 22 and is spaced directly above the bottom outlet of the hopper 11. Catalyst discharging as a compact moving stream from standpipe 17 expands within the chamber 23 to form an exposed annular surface of solids about the lower end of standpipe 17, through which air admitted into chamber 23 through inlet conduit 24 is introduced into the discharging catalyst stream.

Immediately above member 22 a flat horizontal annular mesh screen 25 extends across the annular space between the standpipe 17 and the walls of the conical section 14. Resting upon the mesh screen 25 there is a relatively deep layer of packing material 26, such as "Raschig" rings, which in turn supports the bed of catalyst 21. The packing material 26 extends upwardly within the lower region of the cone 14 for a distance sufficient to assure that in the unusual case where liquid condensate is formed within the bed, the condensate may flow downwardly through the packing material and through the supporting screen 25 into the solids-free space formed between the screen 25 and the frusto-conical member 22. Condensate material, such as oil or water, collecting in this solids-free space is removed through a stand-by drainpipe 27 set in the side wall of the conical section.

Catalyst discharging from the bottom of hopper 11 passes through an elongated vertical seal leg 28 which extends downwardly into the upper end region of a vertical elongated treating vessel 31 located directly below the hopper 11. The hopper 11 is rigidly supported above the treating vessel 31 as by means of a cylindrical member 32 which forms a continuation of the cylindrical side walls of both vessels 11 and 31.

The upper end of vessel 31 is closed by a dished head 33 having a central opening to receive the lower end of the seal leg 28. In entering the vessel 31 the seal leg 28 passes through a sleeve or jacket 34 provided for the purpose of permitting steam to be circulated around the lower end portion of the seal leg so as to carry away heat which would otherwise be transferred from the hot treating gas in vessel 31 to the catalyst in the seal leg 28.

The lower end of seal leg 28 is flared outwardly so that the compact moving stream of catalyst descending through the standpipe forms a gradually widening column of solids before being deposited directly onto the surface of a compact moving bed of catalyst 35 supported within the upper region of vessel 31.

A substantial upper end portion of vessel 31 is occupied by the compact moving bed of catalyst 35 which forms the treating zone and is supported upon an arch, generally indicated by the numeral 36, extending across the mid-region of vessel 31. The arch 36 comprises a masonry supporting structure 37 upon which is set a layer of open brickwork 38. The treating gas is introduced through side inlets 39 into the region of the vessel occupied by the brickwork 38 and passes upwardly into the bed 35. The brickwork arch is surfaced with a layer of perforate tiles 41 upon which are placed inert alumina balls 42. The balls 42 are arranged as a bottom layer of larger-size balls, such as about ¾ of an inch in diameter, and a top layer of smaller balls, such as about ⅜ of an inch in diameter. The treating gas introduced through inlets 39 passes through the spaces separating the bricks in the brickwork layer 38, then passes upwardly through the perforations in the layer of tiles 41, then through the layer of alumina balls 42, and finally flows upwardly through the catalyst forming the bed 35.

A plurality of elongated parallel conduits 43 have their upper ends communicating at a common level with the bottom region of the bed 35 and extend downwardly through the arch 36 to a lower chamber 44 formed between the under side of the arch 36 and a dished tubesheet 45 extending across the lower region of vessel 31. The lower end portions of conduits 43 extend well within the chamber 44, terminating at a common level therein.

Catalyst withdrawn from the bottom of bed 35 passes as a plurality of compact moving streams through conduits 43 and is deposited directly onto the surface of a compact moving bed of catalyst 46 maintained at the bottom of zone or chamber 44.

Chamber 44 provides a cooling zone wherein the hot catalyst discharged from the treating or calcining zone 35 is contacted with steam at a temperature sufficient to provide the desired cooling. The steam is introduced into the lower region of bed 46 through a plurality of nipples 47 having caps 48, of known design, at their upper ends adapted to permit engagement of the steam with the catalyst of bed 46 without permitting the catalyst to descend into the upper ends of the nipples 47. The coolant steam discharging from devices 48 passes upwardly through gravitating bed 46 and is disengaged at the surface thereof. The disengaged steam and other attendant gaseous material collected in the upper region of zone 44 within the solids-free space surrounding conduits 43 is discharged through outlet 49 at the side of the vessel 31.

Below the dished tube-sheet 45 the cylindrical vessel 31 is provided with a conical draw-off section 51, terminating in a bottom discharge opening on the axis of vessel 31. A horizontal partition 52 extends across the intermediate region of conical section 51 to divide the conical section into an upper manifold section 53 for incoming steam and a lower collecting chamber 54 for outgoing catalyst. Coolant steam is introduced into the manifold 53 through side inlet 55, the steam passing upwardly through the nipples 47 and caps 48 into the bed 46. A low vertical cylindrical weir 56 extends upwardly from the perimeter of partition 52 so as to receive any steam condensate collecting on the side walls of the manifold chamber 53. Such condensate is removed through drains 57. Steam condensate collecting on the horizontal surface of partition 52 may be removed through drain 58.

Catalyst is continuously withdrawn from the bottom of bed 46 through a plurality of draw-off conduits 59 which have vertical upper end portions set at spaced locations throughout the area of the dished tube-sheet 45 and sloping lower end portions which communicate at their lower ends with short nipples 61 set on a concentric circle near the perimeter of partition 52 and arranged to discharge compact moving streams of catalyst adjacent to the sloping side wall of conical section 51. The streams of catalyst passing through conduits 59 and nipples 61 are deposited directly onto a compact moving mass of solids sliding down the sloping wall of the conical section 51 toward the central outlet at the bottom thereof.

The compact moving mass of catalyst 62 maintained at the bottom of the conical section 51 within chamber 54 is continuously discharged from the vessel 31 through an elongated seal leg, generally indicated by the numeral 63, and is deposited upon a moving table or other horizontal conveyor 64 which removes the treated material at a predetermined rate.

The seal leg unit 63 comprises a funnel-shaped hopper 65 connected to the discharge opening of conical section 51.

Hopper 65 is provided with a short discharge nipple 66 which discharges the catalyst into a closed housing 67 wherein the catalyst spreads downwardly to form a small compact moving bed 68. The bottom of housing 67 is connected to the upper end of an elongated seal leg conduit 69 which communicates at its lower end with another funnel-shaped member 71.

In order to prevent any of the steam from working its way downwardly through the bottom of the vessel 31 and escaping with the catalyst discharging from the seal leg 63, a gaseous sealing medium, such as air, is introduced into housing 67 through inlet 72. Such sealing gas flows upwardly through the upper end portion of the seal leg 63, through the bed of catalyst 62, and then through the draw-off conduits 59 into the bed 46 of the cooling zone, where it mixes with and is removed with the steam which has been introduced as a coolant.

A portion of the sealing gas flows from housing 67 downwardly through seal leg conduit 69 and is disengaged from the catalyst within the funnel-shaped member 71 which functions as a disengager. The disengaged seal gas, which has been raised to a relatively high temperature by contact with the hot catalyst flowing through the seal leg, is discharged from the disengager 71 through conduit 73. Thus, the seal gas is prevented from discharging with the catalyst from the bottom of the member 71. If the seal gas were to discharge with the catalyst from the bottom of funnel 73 onto the horizontal moving surface 64 located closely adjacent to the bottom of the funnel 71, the gas would interfere with the proper flow or spread of the catalyst onto the conveying surface.

FIG. 2 shows a diagrammatic representation of the treating unit of FIGS. 1 and 1A, together with major portions of the associated equipment required for operation of the unit. A furnace 74 is provided adjacent to the treating unit for the purpose of providing reducing gas at suitable elevated temperature. The fuel required for the production of reducing gas is introduced into furnace 74 through burner inlet line 75. A relatively slight amount of steam accompanies the charge into the furnace for the purpose of keeping the nozzle or burner clean. Such steam introduction is commonly referred to as sweep steam. The hot reducing gas is withdrawn overhead from the furnace through conduit 76 and is conveyed to the inlet conduits 39 at the sides of the treater vessel 31.

The steam discharging from the cooling chamber 44 through outlet 49 is conveyed through conduit 77 into the furnace 74. A high-pressure steam ejector 78 is connected into line 77 to maintain the flow of steam from the cooling zone to the furnace. In order to control the temperature of the reducing gases discharging from the furnace and passing into the treating zone, additional amounts of quench steam are introduced into the furnace, as required. The quench steam is introduced through conduit 79 into conduit 77 where it accompanies the cooling zone discharge into the furnace. The flow of quench steam into the system is controlled by a valve 81 which is operated through a temperature-responsive control mechanism 82 connected between valve 81 and the treating gas conduit 76 leading from the furnace to the treater.

In a calcining operation of the type disclosed, involving direct countercurrent cooling of hot solids with a cold gas, and with the heat capacities of the gas and solids being about equal, a serious problem may arise within the cooling zone by reason of severe channeling of the cooling gas within the compact moving bed of solids.

In accordance with the method of the invention, such tendency of the cooling gas to channel is reduced or eliminated by substantially increasing the cooling steam rate in the steam reheat section of the calciner, for example, to double the normal steam rate. Heretofore it has been a practice to combine the off-steam discharge from the cooling zone with the flue gas from the furnace at a point just ahead of the duct which introduced the reducing gas and steam mixture into the treating zone. The present system achieves a more efficient mixing of the steam and reducing gas by passing the off-steam discharge from the cooling zone directly into the reducing gas furnace, so that the steam and reducing gas are well mixed before leaving the furnace and the mixture may then be conveyed into the treating zone at substantially uniform temperature. A difficulty heretofore encountered, especially by reason of the fact that a relalarge conduit is usually employed to convey the treating gas mixture from the furnace to the treating zone, has been the stratification effect, whereby the gas mixture passing through the conduit or ductwork has a substantial temperature differential between inner and outer layers. With an adverse temperature gradient across the gas stream entering the treating zone, it is to be expected that there may be substantial temperature differences throughout the horizontal area of the solids bed.

To avoid such adverse temperature conditions, the off-steam discharge from the cooling zone is introduced at a number of locations in the uppermost region of the furnace, the steam preferably being introduced through a series of jets adapted to achieve a high degree of mixing between the steam and the reducing gas. In order to maintain the necessary pressure balance within the furnace, it is contemplated that some of the steam may be introduced at a low level within the furnace in order that the desired upward movement of gas may be obtained.

Ordinarily, the total quantity of steam discharged from the cooling zone of the treating units will not be great enough to lower the temperature of the reducing gas sufficiently to produce a furnace off-gas mixture at the desired temperature. To further reduce the temperature of the reducing gas mixture leaving the furnace, additional quench steam is introduced directly into the line which conveys the off-steam from the cooling zone to the furnace, such additional quench steam being supplied in such controlled amount as to provide the additional temperature reduction required in the furnace.

The quantity of quench steam required is controlled through a temperature-responsive valve control mechanism connected to the gas duct leading from the furnace to the treating zone and adapted to operate the valve controlling the main supply of quench steam to the furnace. The proportioning of the major supply of quench steam to be introduced at the top of the furnace and the minor amount of quench steam to be introduced at the bottom in order to maintain a proper pressure balance is preferably initially adjusted manually by suitable valve arrangements of known design.

In a typical operation in accordance with the invention, catalyst stored in the hopper 11 and ready for the calcining treatment is maintained, by means of heating coil 15, at a temperature in the range of about 215–290° F. or at a temperature not greater than that of the denned catalyst entering the hopper, but always above water condensation temperature. A safeguard against the admittance of any appreciable quantity of undesirable gas from the calcining zone into the catalyst storage zone is provided by the sealing arrangements associated with standpipe 17 and seal leg 28 connecting the surge hopper 11 with the treating vessel 31.

Within the calcining zone, represented by the catalyst bed 35 in vessel 31, the catalyst is subjected to relatively rapid heating by countercurrent contact with a hot treating gas mixture, comprising reducing gas and steam, supplied through conduit 39 and introduced into the bottom region of the calcining zone at a temperature in the range of about 1450°–1600° F., such as about 1525°–1550° F. The contact between the treating gas and the catalyst in bed 35 of the calcining zone is such as to heat the catalyst eventually to the treating gas temperature of about 1450°–1600° F., at which elevated temperature the desired calcining treatment is readily effected. The condensate trap provided at the bottom of the storage hopper permits the removal of any condensed moisture which may collect within the surge hopper, and which otherwise might be carried with or on the catalyst stream through the seal leg 28 into the treating zone, which stream, in the worst case, would be wetted and caused to mass or agglomerate. Thus, a possible serious problem with respect to agglomeration of the catalyst particles within the bed 35 is substantially avoided. The catalyst may therefore flow uniformly into and within bed 35 without the danger of clumps plugging the seal leg, with consequent danger of breaking the seal within the seal leg 28.

The catalyst gravitates as a continuous compact moving mass or bed 35 through the calcining zone, and discharges from the bottom thereof through the conduits 43 into the cooling zone at the aforementioned treating gas temperature of about 1450°–1600° F. The off-gas is removed from the top of the calcining zone through outlet conduit 49 at a temperature of about 400°–600° F.

As catalyst discharging from downcomers 43 into the cooling zone 44 spreads outwardly and merges to form the shallow compact moving bed 46, the catalyst is engaged countercurrently with cooling steam introduced through conduit 55 and passing upwardly into the bottom of bed 46. By reason of the fact that the coolant steam discharging from the top of cooling zone 44 through outlet 49 is evacuated by means of a high pressure steam ejector located in the line 77 which conveys the off-steam to the furnace, the relatively cool steam, at a temperature of about 220° F. may be introduced into the cooling zone through conduit 55 at relatively low pressure. This is of considerable advantage in maintaining a practicable flow of steam upwardly through the bed of the cooling zone. In cooling the catalyst, the steam is heated, so that it discharges from the cooling zone through conduit 49 at a temperature of about 900° F.

The cooled catalyst discharging from the bottom of the cooling zone flows downwardly through the draw-off system and is discharged onto the conveying system represented by the numeral 64. While the catalyst is cooled considerably before discharging from the treater vessel, it is still quite hot and, in order that it may be further cooled to a temperature suitable for subsequent handling, additional cooling may be provided while the catalyst is being conveyed from the calcining stage to the next stage of the total operation. During such conveyance away from the calciner, the catalyst may, for example, be cooled to a temperature of about 150° F., at which temperature it is suitable for storage.

Obviously many modifications and variations of the invention as hereinbefore set forth may be made without departing from the spirit and scope thereof, and therefore only such limitations should be imposed as are indicated in the appended claims.

What is claimed is:

1. A method for desulfating granular, acid-treated, clay catalyst to condition the same for use in the catalytic conversion of hydrocarbons, which comprises the steps of: passing said catalyst downwardly as a compact moving bed through a surge zone while maintaining the temperature of said catalyst in the range of about 215–290° F.; withdrawing said catalyst from a region within and near the bottom of said surge zone and passing the withdrawn catalyst as an elongated compact moving column directly onto the surface of a second compact moving bed of said catalyst within an enlarged desulfating zone below said surge zone; introducing seal gas into said column at a side location along its length, thereby forming a seal leg between said surge and desulfating zones; disengaging gaseous material from said catalyst at the top of said seal leg; rapidly heating said catalyst within said desulfating zone by countercurrent flow of a desulfating gas mixture comprising reducing gas and steam introduced into said desulfating zone at an inlet temperature in the range of about 1450–1600° F. and passed through said second compact moving bed until said catalyst has attained said gas inlet temperature; discharging off-gas at the top of said desulfating zone; passing the desulfated catalyst as a plurality of elongated compact moving streams from the bottom of said desulfating zone directly onto the surface of a third compact moving bed of catalyst within a cooling zone below said desulfating zone; cooling said desulfated catalyst by countercurrent flow of low temperature steam through said third bed to thereby lower the temperature of said catalyst to about 600° F.; discharging the cooled, desulfated catalyst from the bottom of said cooling zone; discharging the coolant steam from the top of said cooling zone; combining said discharged coolant steam with reducing gas to form said desulfating gas mixture; and adjusting the temperature of said desulfating gas mixture prior to its introduction into said desulfating zone.

2. The method of claim 1, wherein said reducing gas is produced by the combustion of fuel in a separate heating zone; wherein said coolant steam discharge from said cooling zone is introduced directly into said heating zone; and wherein said temperature adjustment is effected by the introduction of controlled amounts of additional low temperature steam into the stream of said coolant steam passing from said cooling zone to said heating zone.

3. The method of claim 2, wherein the amount of said additional steam introduced as a quench is controlled in accordance with temperature changes in said gaseous mixture of reducing gas and steam flowing from said heating zone to said desulfating zone.

4. In a method for treating granular material comprising acid-treated natural earths and clays so as to condition the same for use as a contact material in the catalytic conversion of hydrocarbons, wherein said granular material is first contacted with a hot mixture of steam and reducing gas to effect a desired desulfation of the material, and is then cooled by contact with coolant steam, and wherein said reducing gas is generated, as needed, in a separate heating zone, the improvement which comprises the steps of: introducing coolant steam at relatively low pressure into said cooling zone so as to effect the desired cooling of the calcined granular material; withdrawing of the hot off-steam from said cooling zone by high-pressure steam ejection and passing all of said off-steam into the upper region of said heating zone as a temperature control in the production of said reducing gas; passing the gaseous mixture of reducing gas and steam from said heating zone to said desulfating zone, said coolant steam normally being insufficient in quantity to alone effect the desired temperature control within said heating zone; introducing additional quench steam into said heating zone to effect a further reduction in the temperature of the gaseous mixture flowing from said heating zone to said desulfating zone; and controlling the amount of said additional quench steam in response to temperature changes in the stream of gas flowing between said zones, whereby the stream of gaseous material entering said desulfating zone is at substantially uniform temperature throughout its cross-sectional area.

5. The method of claim 4, including the step of introducing additional minor amounts of quench steam into the lower region of said heating zone; and manually adjusting the split of quench steam between the portion introduced into the upper region of said heating zone and the portion introduced into the lower region thereof.

6. The method of claim 5, wherein said low-pressure steam is introduced into said cooling zone at a temperature of about 220° F. and is discharged therefrom at a temperature of about 900° F.; wherein said granular material is introduced into said desulfating zone at a temperature in the range of about 215°–290° F. and is discharged therefrom into said cooling zone at a temperature in the range of about 1450°–1600° F.; wherein said granular material is discharged from said cooling zone at a temperature of about 600° F.; and wherein said gaseous mixture comprising reducing gas and steam is introduced into said desulfating zone at a temperature in the range of about 1450°–1600° F.

7. Apparatus for the treatment of natural earths and clays in granular form which comprises an elevated storage hopper for said granular material; indirect heat exchange means associated with said hopper adapted to maintain said granular material at a temperature in excess of a steam condensing temperature; a treating chamber beneath said hopper; seal leg means adapted to convey granular material as an elongated compact moving column from a location above the bottom of said hopper to the upper region of said treating chamber; a water drain outlet at the bottom of said hopper; means for introducing sealing gas at an intermediate location within said column for split flow upwardly and downwardly therethrough; means for disengaging and removing said up-flowing steam at the head of said column; means for introducing a treating gas mixture comprising reducing gas and steam into the lower region of said treating chamber; means for removing the treater off-gas from the upper region of said treating chamber; a cooling chamber beneath said treating chamber; means for passing said granular material as a plurality of elongated compact moving streams from the bottom of said treating chamber to an intermediate level within said cooling chamber; means for introducing low pressure steam into the bottom region of said cooling chamber; a furnace proximate to said treating and cooling chambers; means comprising a high pressure steam ejector for the off-steam from said cooling chamber to said furnace; means for generating reducer gas within said furnace; means for conveying the gaseous mixture of reducing gas and steam from said furnace to said treating chamber; means for introducing additional quench steam into said furnace; temperature-responsive valve control means for controlling the supply of said quench steam to said furnace in accordance with temperature changes within the means for conveying said treating gas mixture from said furnace to said treating chamber; and means for discharging said granular material at a pre-determined controlled rate from said cooling chamber.

8. In an apparatus for the treatment of natural earths and clays in granular solids form comprising a treating chamber wherein said granular material is contacted with a hot gaseous mixture of reducing gas and steam and a cooling chamber beneath said treating chamber wherein the treated granular material is contacted countercurrently with coolant steam, the combination therewith of: a manifold chamber directly beneath said cooling chamber and separated therefrom by a tube-sheet; means for introducing said steam into said manifold chamber; a plurality of steam conduits set in said tube-sheet with their lower ends in open communication with said manifold chamber and their upper discharge ends terminating at a common level within said cooling chamber; means at the upper ends of said plurality of conduits adapted to provide open gaseous communication with said cooling chamber while shielding said upper ends against the admittance into said conduits of granular material descending through said cooling chamber; means for discharging said coolant steam at the upper end of said cooling chamber; a funnel-shaped solids-collecting chamber directly beneath said manifold chamber; a plurality of solids downcomers passing through said manifold with their upper end portions set in said tube-sheet and extending upwardly therefrom to a level within said cooling chamber below the discharge ends of said plurality of steam conduits, and with their lower end portions extending downwardly and laterally into said cooling chamber so as to discharge said solids along a circle adjacent the upper periphery thereof; an elongated seal leg conduit connected to the lower end of said funnel-shaped member and adapted to continuously withdraw a compact moving column of solids from said collecting chamber; means for introducing seal gas into the upper end portion of said column; means for disengaging and separately removing the downwardly flowing portion of said seal gas from said solids near the lower end portion of said column; and means for controlling the rate of discharge of said granular material at the lower end of said column whereby said granular solids material is maintained as a vertically continuous compact moving mass of solids extending upwardly through said apparatus into said treating chamber.

References Cited in the file of this patent

UNITED STATES PATENTS

| | | |
|---|---|---|
| 2,492,958 | Bland | Jan. 3, 1950 |
| 2,882,912 | Reeg et al. | Apr. 21, 1959 |
| 2,898,304 | Powell et al. | Aug. 4, 1959 |